US009690933B1

(12) United States Patent
Singh et al.

(10) Patent No.: US 9,690,933 B1
(45) Date of Patent: Jun. 27, 2017

(54) FRAMEWORK FOR CLASSIFYING AN OBJECT AS MALICIOUS WITH MACHINE LEARNING FOR DEPLOYING UPDATED PREDICTIVE MODELS

(71) Applicant: FireEye, Inc., Milpitas, CA (US)

(72) Inventors: Abhishek Singh, Milpitas, CA (US); Ali Mesdaq, San Jose, CA (US); Anirban Das, Sunnyvale, CA (US); Varun Jain, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 16 days.

(21) Appl. No.: 14/579,896

(22) Filed: Dec. 22, 2014

(51) Int. Cl.
    *G06F 21/56*     (2013.01)
    *G06N 5/02*     (2006.01)
    *H04L 29/06*     (2006.01)

(52) U.S. Cl.
    CPC ............... *G06F 21/56* (2013.01); *G06N 5/02* (2013.01); *H04L 63/1425* (2013.01)

(58) Field of Classification Search
    CPC ...... G06F 21/56; G06F 21/552; G06F 21/566; H04L 63/1408; H04L 63/1416; H04L 63/1425
    See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 11/717,475, filed Mar. 12, 2007 Final Office Action dated Feb. 27, 2013.
U.S. Appl. No. 11/717,475, filed Mar. 12, 2007 Final Office Action dated Nov. 22, 2010.
U.S. Appl. No. 11/717,475, filed Mar. 12, 2007 Non-Final Office Action dated Aug. 28, 2012.
U.S. Appl. No. 11/717,475, filed Mar. 12, 2007 Non-Final Office Action dated May 6, 2010.

(Continued)

*Primary Examiner* — David Pearson
(74) *Attorney, Agent, or Firm* — Rutan & Tucker, LLP

(57) ABSTRACT

According to one embodiment, an apparatus comprises a detection engine and a classification engine. The detection engine is responsible for analyzing an object to determine if the object is malicious. The classification engine is configured to (i) receive results of the analysis of the object conducted by the detection engine and (ii) analyze, based at least in part on the results from the detection engine, whether the object is malicious in accordance with a predictive model. Responsive to the detection engine and the classification engine differing in determinations as to whether the object is malicious, information associated with at least a portion of the results of the analysis of the object by at least one of the detection engine and the classification engine is uploaded for determining whether an update of the predictive model is to occur. An update of the predictive model is subsequently received by the classification engine.

28 Claims, 7 Drawing Sheets

(56) References Cited

U.S. PATENT DOCUMENTS

| | | |
|---|---|---|
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |

(56) References Cited

U.S. PATENT DOCUMENTS

| | | | |
|---|---|---|---|
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,776,229 B1 | 7/2014 | Aziz | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,850,570 B1 | 9/2014 | Ramzan | |
| 8,850,571 B2 | 9/2014 | Staniford et al. | |
| 8,881,234 B2 | 11/2014 | Narasimhan et al. | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,694 B2 | 8/2015 | Aziz et al. | |
| 9,118,715 B2 | 8/2015 | Staniford et al. | |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0095607 A1 | 7/2002 | Lin-Hendel | |
| 2002/0116627 A1 | 8/2002 | Tarbotton et al. | |
| 2002/0144156 A1 | 10/2002 | Copeland | |
| 2002/0162015 A1 | 10/2002 | Tang | |
| 2002/0166063 A1 | 11/2002 | Lachman et al. | |
| 2002/0169952 A1 | 11/2002 | DiSanto et al. | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0101381 A1 | 5/2003 | Mateev et al. | |
| 2003/0115483 A1 | 6/2003 | Liang | |
| 2003/0188190 A1 | 10/2003 | Aaron et al. | |
| 2003/0191957 A1 | 10/2003 | Hypponen et al. | |
| 2003/0200460 A1 | 10/2003 | Morota et al. | |
| 2003/0212902 A1 | 11/2003 | van der Made | |
| 2003/0229801 A1 | 12/2003 | Kouznetsov et al. | |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel et al. | |
| 2004/0088581 A1 | 5/2004 | Brawn et al. | |
| 2004/0093513 A1 | 5/2004 | Cantrell et al. | |
| 2004/0111531 A1 | 6/2004 | Staniford et al. | |
| 2004/0117478 A1 | 6/2004 | Triulzi et al. | |
| 2004/0117624 A1 | 6/2004 | Brandt et al. | |
| 2004/0128355 A1 | 7/2004 | Chao et al. | |
| 2004/0165588 A1 | 8/2004 | Pandya | |
| 2004/0236963 A1 | 11/2004 | Danford et al. | |
| 2004/0243349 A1 | 12/2004 | Greifeneder et al. | |
| 2004/0249911 A1 | 12/2004 | Alkhatib et al. | |
| 2004/0255161 A1 | 12/2004 | Cavanaugh | |
| 2004/0268147 A1 | 12/2004 | Wiederin et al. | |
| 2005/0005159 A1 | 1/2005 | Oliphant | |
| 2005/0021740 A1 | 1/2005 | Bar et al. | |
| 2005/0033960 A1 | 2/2005 | Vialen et al. | |
| 2005/0033989 A1 | 2/2005 | Poletto et al. | |
| 2005/0050148 A1 | 3/2005 | Mohammadioun et al. | |
| 2005/0086523 A1 | 4/2005 | Zimmer et al. | |
| 2005/0091513 A1 | 4/2005 | Mitomo et al. | |
| 2005/0091533 A1 | 4/2005 | Omote et al. | |
| 2005/0091652 A1 | 4/2005 | Ross et al. | |
| 2005/0108562 A1 | 5/2005 | Khazan et al. | |
| 2005/0114663 A1 | 5/2005 | Cornell et al. | |
| 2005/0125195 A1 | 6/2005 | Brendel | |
| 2005/0149726 A1 | 7/2005 | Joshi et al. | |
| 2005/0157662 A1 | 7/2005 | Bingham et al. | |
| 2005/0183143 A1 | 8/2005 | Anderholm et al. | |
| 2005/0201297 A1 | 9/2005 | Peikari | |
| 2005/0210533 A1 | 9/2005 | Copeland et al. | |
| 2005/0238005 A1 | 10/2005 | Chen et al. | |
| 2005/0240781 A1 | 10/2005 | Gassoway | |
| 2005/0262562 A1 | 11/2005 | Gassoway | |
| 2005/0265331 A1 | 12/2005 | Stolfo | |
| 2005/0283839 A1 | 12/2005 | Cowburn | |
| 2006/0010495 A1 | 1/2006 | Cohen et al. | |
| 2006/0015416 A1 | 1/2006 | Hoffman et al. | |
| 2006/0015715 A1 | 1/2006 | Anderson | |
| 2006/0015747 A1 | 1/2006 | Van de Ven | |
| 2006/0021029 A1 | 1/2006 | Brickell et al. | |
| 2006/0021054 A1 | 1/2006 | Costa et al. | |
| 2006/0031476 A1 | 2/2006 | Mathes et al. | |
| 2006/0047665 A1 | 3/2006 | Neil | |
| 2006/0070130 A1 | 3/2006 | Costea et al. | |
| 2006/0075496 A1 | 4/2006 | Carpenter et al. | |
| 2006/0095968 A1 | 5/2006 | Portolani et al. | |
| 2006/0101516 A1 | 5/2006 | Sudaharan et al. | |
| 2006/0101517 A1 | 5/2006 | Banzhof et al. | |
| 2006/0117385 A1 | 6/2006 | Mester et al. | |
| 2006/0123477 A1 | 6/2006 | Raghavan et al. | |
| 2006/0129382 A1* | 6/2006 | Anand | G06F 21/552 704/9 |
| 2006/0143709 A1 | 6/2006 | Brooks et al. | |
| 2006/0150249 A1 | 6/2006 | Gassen et al. | |
| 2006/0161983 A1 | 7/2006 | Cothrell et al. | |
| 2006/0161987 A1 | 7/2006 | Levy-Yurista | |
| 2006/0161989 A1 | 7/2006 | Reshef et al. | |
| 2006/0164199 A1 | 7/2006 | Gilde et al. | |
| 2006/0173992 A1 | 8/2006 | Weber et al. | |
| 2006/0179147 A1 | 8/2006 | Tran et al. | |
| 2006/0184632 A1 | 8/2006 | Marino et al. | |
| 2006/0191010 A1 | 8/2006 | Benjamin | |
| 2006/0221956 A1 | 10/2006 | Narayan et al. | |
| 2006/0236393 A1 | 10/2006 | Kramer et al. | |
| 2006/0242709 A1 | 10/2006 | Seinfeld et al. | |
| 2006/0248519 A1 | 11/2006 | Jaeger et al. | |
| 2006/0248582 A1 | 11/2006 | Panjwani et al. | |
| 2006/0251104 A1 | 11/2006 | Koga | |
| 2006/0253906 A1* | 11/2006 | Rubin | H04L 63/1416 726/23 |
| 2006/0288417 A1 | 12/2006 | Bookbinder et al. | |
| 2007/0006288 A1 | 1/2007 | Mayfield et al. | |
| 2007/0006313 A1 | 1/2007 | Porras et al. | |
| 2007/0011174 A1 | 1/2007 | Takaragi et al. | |
| 2007/0016951 A1 | 1/2007 | Piccard et al. | |
| 2007/0033645 A1 | 2/2007 | Jones | |
| 2007/0038943 A1 | 2/2007 | FitzGerald et al. | |
| 2007/0064689 A1 | 3/2007 | Shin et al. | |
| 2007/0074169 A1 | 3/2007 | Chess et al. | |
| 2007/0094730 A1 | 4/2007 | Bhikkaji et al. | |
| 2007/0101435 A1 | 5/2007 | Konanka et al. | |
| 2007/0128855 A1 | 6/2007 | Cho et al. | |
| 2007/0142030 A1 | 6/2007 | Sinha et al. | |

(56) References Cited

U.S. PATENT DOCUMENTS

| | | |
|---|---|---|
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0169195 A1* | 7/2007 | Anand ............... H04L 63/1416 726/23 |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240217 A1* | 10/2007 | Tuvell .................... G06F 21/56 726/24 |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1* | 7/2009 | Stolfo .................... G06F 21/564 714/26 |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0167219 A1* | 6/2012 | Zaitsev .................. G06F 21/566 726/24 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |

(56) References Cited

U.S. PATENT DOCUMENTS

| | | | |
|---|---|---|---|
| 2012/0210423 A1 | 8/2012 | Friedrichs et al. | |
| 2012/0222121 A1 | 8/2012 | Staniford et al. | |
| 2012/0255015 A1 | 10/2012 | Sahita et al. | |
| 2012/0255017 A1 | 10/2012 | Sallam | |
| 2012/0260342 A1 | 10/2012 | Dube et al. | |
| 2012/0266244 A1 | 10/2012 | Green et al. | |
| 2012/0278886 A1 | 11/2012 | Luna | |
| 2012/0297489 A1 | 11/2012 | Dequevy | |
| 2012/0330801 A1 | 12/2012 | McDougal et al. | |
| 2013/0014259 A1 | 1/2013 | Gribble et al. | |
| 2013/0036472 A1 | 2/2013 | Aziz | |
| 2013/0047257 A1 | 2/2013 | Aziz | |
| 2013/0074185 A1 | 3/2013 | McDougal et al. | |
| 2013/0086684 A1 | 4/2013 | Mohler | |
| 2013/0097699 A1 | 4/2013 | Balupari et al. | |
| 2013/0097706 A1 | 4/2013 | Titonis et al. | |
| 2013/0111587 A1 | 5/2013 | Goel et al. | |
| 2013/0117852 A1 | 5/2013 | Stute | |
| 2013/0117855 A1 | 5/2013 | Kim et al. | |
| 2013/0139264 A1 | 5/2013 | Brinkley et al. | |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0328204 A1 | 11/2014 | Klotsche et al. | |
| 2014/0337836 A1 | 11/2014 | Ismael | |
| 2014/0351935 A1 | 11/2014 | Shao et al. | |
| 2015/0026810 A1* | 1/2015 | Friedrichs | H04L 63/1416 726/23 |
| 2015/0096025 A1 | 4/2015 | Ismael | |

FOREIGN PATENT DOCUMENTS

| | | |
|---|---|---|
| WO | 0223805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

U.S. Appl. No. 14/059,381, filed Oct. 21, 2013 Non-Final Office Action dated Oct. 29, 2014.
Venezia, Paul, "NetDetector Captures Intrusions", InfoWorld Issue 27, ("Venezia"), (Jul. 14, 2003).
Whyte, et al., "DNS-Based Detection of Scanning Works in an Enterprise Network", Proceedings of the 12th Annual Network and Distributed System Security Symposium, (Feb. 2005), 15 pages.
Williamson, Mathew M., "Throttling Virses: Restricting Propagation to Defeat Malicious Mobile Code", ACSAC Conference, Las Vegas, NV, USA, (Dec. 2002), pp. 1-9.
Adobe Systems Incorporated, "PDF 32000-1:2008, Document management—Portable document format—Part1:PDF 1.7", First Edition, Jul. 1, 2008, 756 pages.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Clark, John, Sylvian Leblanc,and Scott Knight. "Risks associated with usb hardware trojan devices used by insiders." Systems Conference (SysCon), 2011 IEEE International. IEEE, 2011.
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek—.com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Mori, Detecting Unknown Computer Viruses, 2004, Springer-Verlag Berlin Heidelberg.
Oberheide et al., CloudAV.sub.—N-Version Antivirus in the Network Cloud, 17th USENIX Security Symposium USENIX Security '08 Jul. 28-Aug. 1, 2008 San Jose, CA.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Network Security: NetDetector—Network Intrusion Forensic System (NIFS) Whitepaper", ("NetDetector Whitepaper"), (2003).
"Packet", Microsoft Computer Dictionary Microsoft Press, (Mar. 2002), 1 page.

(56) References Cited

OTHER PUBLICATIONS

"When Virtual is Better Than Real", IEEEXplore Digital Library, available at, http://ieeexplore.ieee.org/xpl/articleDetails.jso?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
AltaVista Advanced Search Results. "attack vector identifier" Http://www.altavista.com/web/results?Itag=ody&pg=aq&aqmode=aqa=Event+Orchestrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orchesrator . . . , (Accessed on Sep. 3, 2009).
Aura, Tuomas, "Scanning electronic documents for personally identifiable information", Proceedings of the 5th ACM workshop on Privacy in electronic society. ACM, 2006.
Aziz, Ashar, System and Method for Malware Containment, U.S. Appl. No. 14/620,060, filed Feb. 11, 2015, non-Final Office Action dated Apr. 3, 2015.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists,org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Cohen, M.I., "PyFlag—An advanced network forensic framework", Digital investigation 5, ELSEVIER, (2008), pp. S112-S120.
Costa, M., et al., "Vigilante: End-to-End Containment of Internet Worms", SOSP '05 Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., ""Zlib compressed data format specification version 3.3" RFC 1950, (1996)".
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
Goel, et al., Reconstructing System State for Intrusion Analysis, Apr. 2008 SIGOPS Operating Systems Review vol. 42 Issue 3, pp. 21-28.
Hjelmvik, Erik, "Passive Network Security Analysis with NetworkMiner", (In)SECURE, Issue 18, (Oct. 2008), pp. 1-100.

IEEE Xplore Digital Library Sear Results for "detection of unknown computer worms". Http//ieeexplore.ieee.org/searchresult.jsp?SortField=Score&SortOrder=desc&ResultC . . . (Accessed on Aug. 28, 2009).
Kaeo, Merike, "Designing Network Security", ("Kaeo"), (Nov. 2003).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), 2003.
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Liljenstam, Michael, et al., "Simulating Realistic Network Traffic for Worm Warning System Design and Testing", Institute for Security Technology studies, Dartmouth College, ("Liljenstam"), (Oct. 27, 2003).
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12—final107.pdf [retrieved on Dec. 15, 2014].
Marchette, David J., Computer Intrusion Detection and Network Monitoring: A Statistical ("Marchette"), (2001).
Margolis, P.E., "Random House Webster's Computer & Internet Dictionary 3rd Edition", ISBN 0375703519, (Dec. 1998).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Peter M. Chen, and Brian D. Noble, "When Virtual Is Better Than Real, Department of Electrical Engineering and Computer Science", University of Michigan ("Chen"), 2001.
Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/~casado/pcap/sectionl.html, (Jan. 6, 2014).

* cited by examiner

US 9,690,933 B1

FRAMEWORK FOR CLASSIFYING AN OBJECT AS MALICIOUS WITH MACHINE LEARNING FOR DEPLOYING UPDATED PREDICTIVE MODELS

FIELD

Embodiments of the disclosure relate to the field of cyber security. More specifically, one embodiment of the disclosure relates to a system, apparatus and method for automatically updating a classification engine that analyzes an object and determines whether the object is to be classified as malicious.

GENERAL BACKGROUND

Over the last decade, network devices that access the Internet or other publicly accessible networks have been increasingly subjected to malicious attacks. These malicious attacks may simply involve the use of stolen credentials by an unauthorized person in efforts to illicitly gain access to information stored within a network device. However, other malicious attacks may be more complex.

In general, malicious attacks may be carried out via an exploit or malware. An exploit is information that attempts to take advantage of a vulnerability in computer software or systems by adversely influencing or attacking normal operations of a targeted computer.

For example, malicious attacks may involve malicious software that has been downloaded by the network device. In some situations, the victim is unaware that the malicious software has been downloaded and stored within her network device. In other situations, the victim is aware that the software has been downloaded, but is unaware of its malicious activity. After being stored on the victim's network device, malicious software may, by design, compromise the network device, for example, by employing an exploit to take advantage of a software vulnerability in the network device in order to harm or co-opt operation of the network device. For instance, the malicious software may (i) gain access to certain stored information and attempt to upload such information to a targeted Command and Control (CnC) server or (ii) establish connectivity between the network device to a remote computer in efforts to exfiltrate stored information.

New malicious software is released to the Internet regularly. The speed at which attackers revise the attacks of their malicious software through code modifications requires cyber security service providers to match this speed in revising detection capabilities for these threats. For a two-stage threat detection platform, which conducts both static and dynamic analysis of incoming data, a classification engine that classifies whether the data under analysis is "malicious" (e.g., a classification that identifies a certain likelihood that the data is malicious), needs to be regularly updated to remain effective.

The classification engine is responsible for classifying data as malicious or not based on whether such data includes one or more features that already have been determined to suggest maliciousness at an associated probability level. These features may include (i) a particular file size, (ii) presence of an attachment, (iii) format type (e.g., whether the file includes an executable, a portable document format "pdf" document, etc.), (iv) specific data patterns, (v) source of the file, and (vi) a structure of the file. Reliance on manually initiated updates for the classification engine tends to be problematic as these updates are not regularly provided, due to human error in some cases. A technique is needed that will automatically update the detection capabilities of the classification engine with a reduced update cycle time.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the disclosure relate to a framework which, based upon the threats detected, periodically, aperiodically, or continuously updates a classification engine to better recognize the presence of malicious software and/or exploits (referred collectively referred to herein as "malware") within analyzed objects. This framework features a training engine that, based on information associated with detected threats, automatically (and without user intervention) issues an alert when the classification engine requires updating. Once the alert is issued by the training engine, one or more parameters (e.g., particulars to an analyzed feature of the object, including score, weighting, string length, bit size, character type, etc.) within a predictive model are modified (e.g., added, deleted and/or changed). The "predictive model" is logic that controls the analysis conducted by a classification engine, and modification of the predictive model is conducted to reduce the number or rate of false negative events by the classification engine.

As described herein, the classification engine may be deployed for classifying an object as malicious or not malicious based on static analysis results, although inventive aspects set forth in the disclosure may also be employed to automatically update a classification engine operating on behaviors observed during run-time analysis or operating on both static analysis results and observed behaviors.

I. Detailed Summary

According to one embodiment of the disclosure, logic is provided to enhance operability of a classification engine by evaluating results in the analysis of an object by that classification engine operating in accordance with a current predictive model. This logic, referred to herein as a "training engine," conducts this evaluation in order to determine whether the current predictive model needs updating to more accurately classify whether an object (e.g., any collection of data including a file, document, web page, etc.) is "malicious" (e.g., varying in degree from definitely malicious to a level where the object is suspected to be malicious, sometimes referred to as "suspicious"), or benign (non-malicious). Additionally, the training engine is configured to automatically generate an updated predictive model (hereinafter referred to as a "reference model") based on actual feature(s) of the suspect object.

Figure 2:
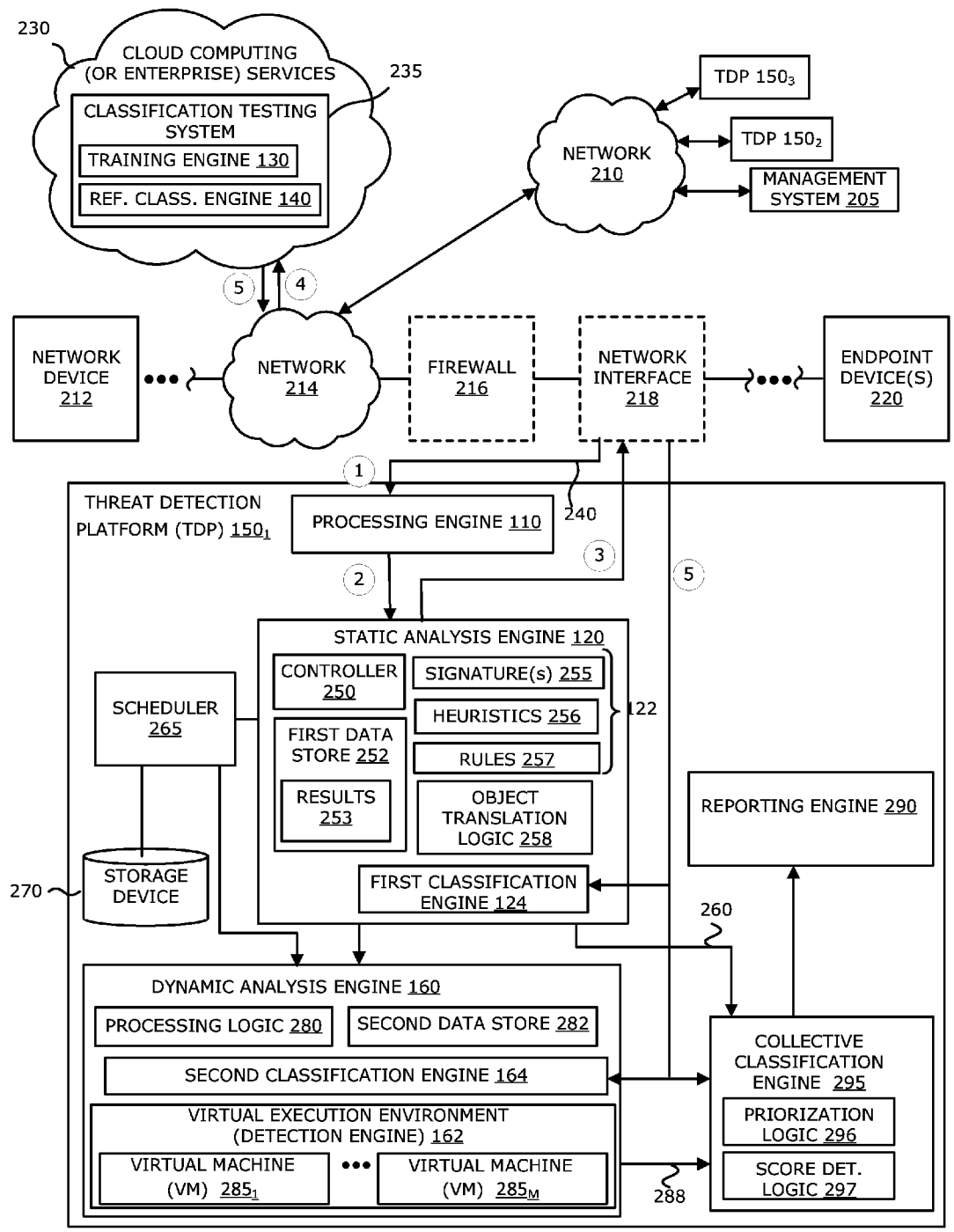
FIG. 2 is an exemplary block diagram of a communication system deploying one or more threat detection platforms (TDPs) communicatively coupled to a management system.

Herein, the type of triggering event that causes the feature(s) of the suspect object to be provided to the training engine may vary, depending on the desired involvement of the training engine in the modification of the classification engine. As an example, one triggering event may be based on identifying a disagreement as to whether an object under analysis is malicious between a detection engine and a classification engine within the same security appliance (herein referred to as a "threat detection platform"). The disagreement may be based on difference in the degree (or level) of detected "maliciousness" or "non-maliciousness" (e.g., malicious v. non-malicious, detected "malicious" levels differ, etc.). According to this embodiment of the disclosure, the detection engine and the classification engine correspond to the same analysis engine (e.g., static analysis engine or the dynamic analysis engine as illustrated in FIG. 2).

Another triggering event may be based on outputted results from a collective classification engine that receives results from one of more of the analysis engines (e.g., detection engines from the static analysis engine and/or the dynamic analysis engine). Herein, the collective classification engine generates a result that identifies, for reporting purposes, whether the object under analysis is malicious—the triggering event may occur when the result fails to accurately identify the level of maliciousness for that object. For example, the collective classification engine may determine a confidence score (X) that barely classifies the object as "malicious", and the triggering event occurs when the confidence score (X) deviates from a predetermined confidence score (X+Y or X−Y) by a prescribed threshold (e.g., less than a maximum confidence score (X+Y) by the prescribed threshold (Z, Z<Y) or greater than a set confidence score (X−Y) by less than the prescribed threshold (Z, Z>Y)).

For instance, as an illustrative embodiment, the training engine may be deployed to receive features associated with a suspect object that is considered to be "malicious" by a detection engine. In this embodiment, deployed within a static analysis engine, the detection engine conducts static analysis such as exploit-specific checks, vulnerability-specific checks or rule-based checks or checks based upon emulation for example, to determine whether the analyzed object includes one or more features that suggest that the object is "malicious" (e.g., indicates that there exists at least a prescribed probability that the one or more features may be associated with a malicious attack).

Where the detection engine determines that the suspect object may include one or more malicious features, but the classification engine using the current predictive model for analysis classifies the object as non-malicious (e.g., assigns a confidence value that falls below a certain threshold), this denotes a potential false negative event. As a result, the threat detection platform transmits a control message to the training engine, where the control message may include (1) an identifier of the object (e.g., hash value of the object), (2) one or more suspect features of the object that can be used by the predictive model to classify the file as malicious, and/or (3) results from the preliminary classification of the suspect object by this platform-based classification engine (e.g., confidence values). Concurrently, where the disagreement between the detection engine and the classification engine occurs in the static analysis engine, the object and perhaps the results from the detection engine may be provided to a virtual execution environment within the threat detection platform for dynamic analysis.

Otherwise, when the object is determined to be malicious by both the detection engine and the (platform-based) classification engine associated with the static analysis engine, the object under analysis is provided to the virtual execution environment without initiating a triggering event.

Potentially located outside the enterprise and accessible by a cyber-security service provider, the training engine receives the identifier of the suspect object (e.g., hash value of the object) to determine if the object has been evaluated previously in accordance with the current predictive model. If not, the training engine may modify one or more parameters associated with the current predictive model to better detect those feature(s) associated with the suspect object that have been determined to be malicious by the detection engine as described above. This modification may involve altering parameters by changing certain values in a decision-tree analysis associated with the current predictive model, which produces an updated predictive (reference) model.

As an illustrative example, the modification of the current predictive model may include changing character string values associated with a name of the object, which may signify the object is malicious. These character string values may include, but are not limited or restricted to length or character types. Another modification may include increasing values (e.g., confidence scores) that are assigned to certain types of features to decrease the number (or rate) of false negative events, or may involve decreasing values assigned to certain types of features to reduce the number (or rate) of false positive events. Additionally, modification may further involve adding or deleting analytical operations from the decision-tree analysis of the current predictive model (e.g., adding/removing certain analysis, etc.).

Based at least in part on the results from the preliminary classification by the platform-based classification engine (e.g., confidence values), which over time identifies whether the current predictive model is ineffective or is becoming less effective in detecting malicious attacks, an alert is provided from the training engine to update a reference classification engine accessible by the cyber security service provider along with one or more platform-based classification engines with the reference model.

It is contemplated that the classification engines may be updated based on analysis and classification of objects conducted by other security appliances (for a more holistic view of malware features) and of forensic work by expert analysts and laboratories. As a result, the reference model is not modified based solely on objects uploaded by a single security appliance.

II. Terminology

In the following description, certain terminology is used to describe features of the invention. For example, in certain situations, both terms "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Engine (or component/logic) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent data store such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected features and, during processing, a set of expected behaviors. The object may also exhibit a set of unexpected features and a set of unexpected behaviors that may evidence malware and potentially allow the object to be classified as malware.

The term "model" generally refers to logic that is used in classifying an object under analysis as malicious or not. One type of model includes a predictive model, which may be logic in the form of a decision-tree based analysis in which parameters associated with the analysis or certain decisions may be modified in order to "tune" the analysis to improve performance.

The term "transmission medium" is a physical or logical communication path between two or more electronic devices (e.g., any devices with data processing and network connectivity such as, for example, a security appliance, a server, a mainframe, a computer such as a desktop or laptop, netbook, tablet, firewall, smart phone, router, switch, bridge, etc.). For instance, the communication path may include wired and/or wireless segments, and/or shared memory locations. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for updating classification engines. As this invention is susceptible to embodiments of many different forms, it is intended that the present disclosure is to be considered as an example of the principles of the invention and not intended to limit the invention to the specific embodiments shown and described.

III. Classification Engine Update Scheme

Figure 1:
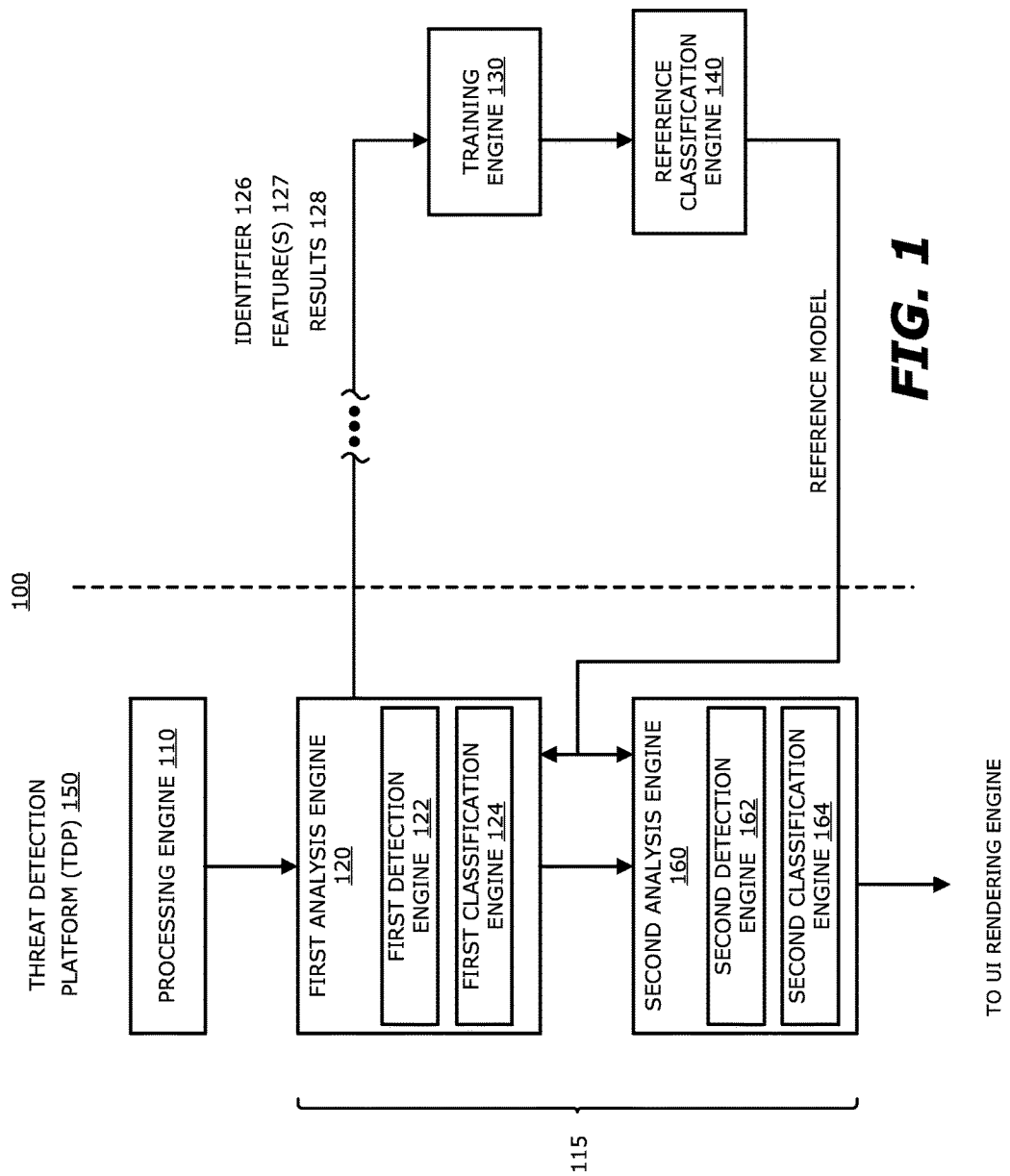
FIG. 1 is an exemplary block diagram of a sequence of operations for a threat detection platform.

Referring to FIG. 1, an exemplary block diagram of a sequence of operations for threat detection within a system that is configured to detect malicious attacks is shown. The system 100 may broadly include a plurality of components, namely a processing engine 110, one or more analysis engines 115, a training engine 130, and a reference classification engine 140. According to this embodiment, the processing engine 110 and the analysis engine(s) 115 operate on a security appliance (referred to as "threat detection platform") located within an enterprise while the training engine 130 and the reference classification engine 140 may operate as cloud computing services for example, may operate in a different enterprise, or may operate within the same enterprise as the processing engine 110 and analysis engine(s) 115.

Located in the threat detection platform 150, the processing engine 110 receives an object and converts that object into a format, as needed or appropriate, on which deep scanning by at least a first analysis engine 120 can be applied. This conversion and scanning may involve decompression of the object, decompilation of the object, extraction of specific data associated with the object, and/or emulation of the extracted data (like Javascript).

Located in the threat detection platform 150 as part of the first analysis engine 120 (e.g., static analysis engine), a first detection engine 122 is configured to conduct exploit-specific checks, vulnerability-specific checks and/or rule-based checks on the data associated with the object, as described below. Based on the results of the check(s), the first detection engine 122 may uncover one or more features that may indicate that the suspect object is malicious. These features may also be supplied to a first, platform-based classification engine 124 that determines, based on analysis of the feature(s) given its predictive model, whether the suspect object is malicious or not.

According to one embodiment of the disclosure, in response to a triggering event, such as where the object is determined to be malicious by the first detection engine 122, but is classified by the first classification engine 124 as non-malicious, information associated with the object may be provided to the training engine 130. It is contemplated that this triggering event may occur in response to this discrepancy or may be programmed for throttling the triggering event based on the degree of discrepancy, the rate or periodicity of discrepancies, or the number of times that the discrepancy occurs. When provided, this object information may include, but is not limited or restricted to (1) an identifier 126 of the object (e.g., hash value of the object such as a message digest produced in accordance with Message Direct "MD5" algorithm), (2) one or more features 127 of the suspect object that are associated with a malicious attack, and/or (3) results 128 of the preliminary classification by the first classification engine 124 (e.g., confidence values). Concurrently, the object and results in the preliminary analysis by the first analysis engine 120 are provided to a second analysis engine 160.

Of course, it is contemplated that, where the object is determined to be non-malicious (or malicious) by both the first detection engine 122 and the first classification engine 124, the object and results are merely provided to the second (dynamic) analysis engine 160. The training engine 130 is to receive information where the analysis results from the first detection engine 122 and the first classification engine 124 differ as to whether the object under analysis is malicious or not. However, according to another embodiment of the disclosure, this difference in analysis may occur when the suspect object is determined to be malicious by both the first detection engine 122 and the first classification engine 124, but the confidence score produced by the first classification engine 124 falls below a prescribed score threshold.

Located remotely from the threat detection platform 150, such as part of a cloud computing service or within a different enterprise network for example, the training engine 130 is configured to receive an identifier for the object in order to determine if the object has been previously analyzed in a potential update of the current predictive model. If not, the training engine 130 makes use of one or more features of the suspect object from the first detection engine 122 to determine if the object is malicious and determines which portions within the current predictive model need to be modified to better detect such features for classifying files as malicious.

There exist a few schemes that may be used by the training engine 130 to determine when an alert should be issued to update the current predictive model used by the reference classification engine 140 and/or platform-based classification engine(s) 124 and/or 164. For instance, the training engine 130 may rely on the received confidence score from the first classification engine 124 to determine accuracy in classifying a detected malicious object. In response to consistent false negative events by the classification engine 124 (e.g., the detected false negative events exceed a certain number or a prescribed rate) or a prescribed period of time has elapsed between updates, the training engine 130 may issue signaling, referred to as an "alert," to update the reference classification engine 140 and/or platform-based classification engines 124 and/or 164 deployed at the customer. According to one embodiment, the reference model is generated as part of the cloud computing services or as part of services for an enterprise.

Similarly, the training engine 130 may issue an alert to update the reference classification engine 140 and subsequently platform-based classification engines 124/164 within the TDP(s) when an average confidence score for different objects that are detected as malicious by the first detection engine 122 (but are considered non-malicious by the first classification engine 124), as measured over a prescribed period of time, falls below a minimum detection threshold. Alternatively, the training engine 130 may issue an alert in response to a series of confidence scores for different objects that are detected as malicious by the first detection engine 122 (but are considered non-malicious by the platform-based classification engine 124) are consistently decreasing (over a prescribed period of time) by a certain amount (or percentage). As yet another alternative, the training engine 130 may prompt the reference classification engine 140 to analyze one or more features associated with a subsequent object under analysis using the reference model and determine whether the resultant confidence score exceeds the received confidence score by a prescribed amount (in value or in percentage).

Located as a cloud computing service or within a separate enterprise network or within the same enterprise network but at a different location as TDP 150 for this embodiment, the reference classification engine 140 receives the reference model (updated predictive model) produced by the training engine 130 or receives specific updates that are applied to the current reference model by the reference classification engine 140 to produce the reference model. According to one embodiment of the disclosure, the reference model is returned to the threat detection platform 150 to update the classification engine 124 that classifies analytic results associated with the first detection engine 122 of the static analysis engine 120. Additionally, or in the alternative, the reference model may be returned to the threat detection platform 150 to update a classification engine 164 associated with the second analysis engine 160, or any other platform-based classification engine, as described below in further detail.

Of course, it is contemplated that object classification associated with the static analysis results may be handled as cloud computing services without deployment of the first classification engine 124. For this embodiment, information associated with malicious objects would be uploaded to the reference (cloud-based) classification engine 140. The reference classification engine 140 would determine whether information needs to be provided to the training engine 130 for modification of the predictive model associated with the classification engine. The reference model also may be returned to another classification engine within the TDP 150 for subsequent classification of the suspect object by the second (dynamic) analysis engine 160.

IV. Exemplary System Architectures

Referring to FIG. 2, an exemplary block diagram of a communication system 200 deploying one or more threat detection platforms (TDPs) $150_1$-$150_N$ (N≥1, N=3 for this embodiment) communicatively coupled to a management system 205 via a network 210 is shown. In general, the management system 205 is adapted to manage TDPs $150_1$-$150_3$. While cloud computing services 230 (or services via a separate enterprise) may be responsible for updating predictive models utilized by one or more classification engines deployed within the TDP $150_1$, the management system 205 is responsible for updating software utilized by the TDPs $150_1$-$150_3$. Such updating may be conducted automatically or conducted manually via uploads by an administrator. Also, such updating may be conducted freely among the TDPs $150_1$-$150_3$ or subject to a subscription basis in which periodic or aperiodic updates of the predictive model are provided by a service including the classification testing system 235.

Herein, according to the embodiment illustrated in FIG. 2, a first TDP $150_1$ is an electronic device that is adapted to analyze information associated with network traffic from at least one network device 212 for transmission over a communication network 214, such as communications with server. The communication network 214 may include a public network such as the Internet, in which case an optional firewall 216 (represented by dashed lines) may be interposed prior to accessing another network device 220. Alternatively, the communication network 214 may be a private network such as a wireless data telecommunication network, wide area network, a type of local area network (LAN), or a combination of networks.

As shown, the first TDP $150_1$ may be communicatively coupled with the communication network 214 via an interface 218. In general, the interface 218 operates as a data capturing device (sometimes referred to as a "tap" or "network tap") that is configured to receive data propagating to/from the network device 220 within an enterprise network and provide at least some of this data to the first TDP $150_1$ or a duplicated copy of the data. Alternatively, although not shown in detail, the first TDP $150_1$ may be positioned behind the firewall 216 and at least partially in-line with network (client) device 220 so as to subject incoming traffic to analysis (e.g., through static analysis) and potentially block that which is classified as malware from reaching its destination.

According to an embodiment of the disclosure, the interface 218 may be further configured to capture metadata from network traffic associated with network device 220. According to one embodiment, the metadata may be used, at least in part, to determine protocols, application types and other information that may be used by logic within the first TDP $150_1$ to determine particular software profile(s). The software profile(s) are used for selecting and/or configuring one or more virtual machines $285_1$-$285_M$ (M≥1) within a runtime, virtual execution environment 162 of the dynamic analysis engine 160, as described below. These software profile(s) may be directed to different software or different versions of the same software application extracted from software image(s) fetched from storage device 270.

In some embodiments, interface 218 may provide connectivity to a server or any device with storage capability through a dedicated transmission medium such as a wireless channel, a wired cable or the like. Although not shown, interface 218 may be contained within the first TDP $150_1$. In other embodiments, the interface 218 can be integrated into an intermediary device in the communication path (e.g., firewall 216, router, switch or other networked electronic device, which in some embodiments may be equipped with SPAN ports) or can be a standalone component, such as an appropriate commercially available network tap.

As further shown in FIG. 2, the first TDP $150_1$ comprises processing engine 110, the first (static) analysis engine 120, a scheduler 265, a storage device 270, a second (dynamic) analysis engine 160, reporting engine 290 with an optional user interface capability, and/or a collective platform-based classification engine 295. The first TDP $150_1$ operates in combination with the classification testing system 235, which includes the training engine 130, by uploading information that may assist the training engine 130 in determining whether logic within the classification engine 124, 164 and/or 295 requires updating. The logic may include a predictive model, namely decision-tree learning logic at least partially developed using machine learning techniques from prior analysis of labelled and unlabeled malware, benign objects and/or experiential knowledge from human analysts that determines whether feature(s) of the suspect object indicate that the object is malicious (e.g., associated with a particular malware).

The processing engine 110 of the first TDP $150_1$ is configured to receive an incoming object 240 (operation 1) and to convert the object 240 into a format that may be subsequently analyzed by the static analysis engine 120 to determine if the object 240 includes one or more features that are considered potentially associated with malicious activity. This conversion may involve decompression and/or decompilation of the object 240, extraction of specific data of the object 240, and/or emulation of the extracted data.

The static analysis engine 120 comprises a controller 250, a first data store 252, the detection engine 122, object transformation logic 258 and the first classification engine 124. The controller 250 is logic that controls operations conducted within the static analysis engine 120. These operations may include data storage within first data store 252; pattern matching of the incoming object 240 to determine whether the object 240 includes one or more malicious features; preliminary classification of the object 240; and/or cryptographic operations on the object 240, including one-way hash operations.

Herein, the static analysis engine 120 includes the detection engine 122 that includes one or more software modules that, when executed by controller 250, analyzes features for the incoming object 240 (e.g., a portion of network traffic, an uploaded file, etc.). As such, the detection engine 122 analyzes the object 240 through one or more pattern checking operations without execution of the object 240. Examples of the pattern checking operations may include signature matching 255 to conduct (a) exploit signature checks, which may be adapted to compare at least a portion of the object 240 with one or more pre-stored exploit signatures (pre-configured and predetermined attack patterns) from signature database (not shown), and/or (b) vulnerability signature checks that may be adapted to uncover deviations in messaging practices (e.g., non-compliance in communication protocols, message formats or ordering, and/or payload parameters including size). Other examples of these pattern checking operations may include (i) heuristics 256, which is based on rules or policies as applied to the object and may determine whether one or more portions of the object 240 is associated with an anomalous or suspicious feature (e.g., a particular URL associated with known exploits, or a particular source or destination address etc.) associated with known exploits; or (ii) determinative rule-based analysis 257 that may include blacklist or whitelist checking.

After operations are conducted by the detection engine 122 to uncover potentially malicious features in the object 240, the classification engine 124 determines whether this object 240 is "malicious," namely whether certain features of the object 240 suggest an association with a malicious attack. According to one embodiment of the disclosure, in addition (or in the alternative) to being stored in the first data store 252, some or all of results produced by the detection engine 122 may be provided to the first classification engine 124, which is configured to determine a probability (or level of confidence) that the suspect object 240 is malware.

More specifically, the first classification engine 124 may be configured to determine a probability (or level of confidence) that the object 240 is associated with a malicious attack. This probability may be represented through a value (referred to as a "static analysis confidence score") that may be used by the training engine 130 to identify the need for updating the predictive model utilized by the first classification engine 124. The static analysis confidence score may be determined based, at least in part, on (i) the particular pattern matches; (ii) heuristic or determinative analysis results; (iii) analyzed deviations in messaging practices set forth in applicable communication protocols (e.g., HTTP, TCP, etc.); (iv) analyzed compliance with certain message formats established for the protocol (e.g., out-of-order commands); and/or (v) analyzed header or payload parameters to determine compliance.

Furthermore, the static analysis engine 120 may route this suspect object 240 (or specific portions or features of the suspect object 240) to the dynamic analysis engine 160 for more in-depth analysis. Also, results 253 of the static analysis may be stored within the first data store 252. The static analysis results 253 may include (i) a static analysis confidence score (described above) and/or (ii) metadata associated with the object. The metadata may include (a) features associated with malware (e.g., matched signature patterns, certain heuristic or statistical information, etc.), and/or (b) other types of metadata associated with the object under analysis (e.g., name of malware or its family based on the detected exploit signature, anticipated malicious activity associated with this type of malware, etc.).

After analysis of the object, the static analysis engine 120 may route the suspect object 240 to the dynamic analysis engine 160, which is configured to provide more in-depth analysis by analyzing the suspect object in a VM-based operating environment. Although not shown, the suspect object 240 may be buffered by the first data store 252 or a second data store 282 until ready for processing by virtual execution environment 162. Of course, if the object 240 is not suspected of being part of a malicious attack, the static analysis engine 120 may denote that the object is benign, and thus, refrain from passing information associated with object 240 to the training engine 130. Instead, the object 240 is passed to the dynamic analysis engine 160 for subsequent analysis.

More specifically, after analysis of the features of the suspect object 240 has been completed (or after analysis of multiple suspect objects where certain features are buffered), the static analysis engine 120 may provide at least some or all of the features that are identified as being potentially associated with malware, to the training engine 130 for determination as to whether updating of the first classification engine 124 (and/or any other classification engine 140, 164 and/or 295) is necessary. According to one embodiment of the disclosure, the static analysis engine 120 provides (1) an identifier (e.g., hash value) of the suspect object 240, (2) one or more suspect features of the suspect object 240 and/or (3) some or all of the results 253 from the static analysis, which may include static analysis confidence value. The upload of this information is identified by operations 3-4.

Located outside an enterprise featuring the TDP 150$_1$, the training engine 130 receives the identifier 126 of the object (e.g., hash value of the object) to determine if the object has been evaluated previously in accordance with the current predictive model. This may be accomplished by comparing a listing of identifiers maintained by the training engine 130, where each identifier represents an object whose features have already been evaluated in updating the current predictive model. If the suspect object 240 has been previously evaluated, the training engine 130 may disregard such features or further adjust parameters within the updated current predictive (reference) model given that there are repeated occurrences of this type of malicious object or the object now includes different features that have not been considered.

If the object has not been previously evaluated, the training engine 130 analyzes the results, and based on the analysis, may modify one or more parameters associated with the reference model to better detect the one or more features associated with the received object that have been determined to be malicious by the static analysis engine 120 as described above. Determined through analysis of the results 253 from the static analysis engine 120, this parameter modification may include changing certain values in the decision-tree analysis as provided by the current predictive model.

As an illustrative example, suppose that the filename analysis in the current predictive model is represented by the following in which a score of 80 out of a maximum 100 is applied if the name of the object is greater than 15 characters and does not begin with an alphanumeric character (A-Z or 0-9):

if length_of_string (string)>15
      if first_char≠char '[A-Z]'
      if first_char≠'[0-9]'
    score=80

The parameter modification may involve altering the length of the string parameter, checking for first character, etc. upon the training engine 130 determining that this feature (e.g., name length and/or character string types) has a higher correlation to maliciousness than previously assigned. In combination with or in the alternative, the parameter modification may involve removal of the first character "0" as suspect objects that have been received by the training engine 130 are now tending to include the "0" at the start of the object name.

Based at least in part on the static analysis confidence values, which over time identifies whether the current predictive model remains ineffective or is becoming less effective, an alert is provided from the training engine 130 to update the reference classification engine 140, which is immediately accessible by the cyber security service provider. The reference classification engine 140 may be used to update platform-based classification engines (e.g., classification engine 124, 164 and/or 295) with the reference model as illustrated in operation 5. Of course, it is contemplated that the TDP 150$_1$ may not feature any platform-based classification engines, and in this type of deployment, the reference classification engine 140 would only need to be updated.

Referring still to FIG. 2, in one embodiment of the disclosure, the scheduler 265 may be adapted to configure one or more VMs 285$_1$-285$_M$ based on metadata associated with a flow that includes the object under analysis. For instance, the VMs 285$_1$-285$_M$ may be configured with software profiles corresponding to the software images stored within storage device 270. As an alternative embodiment, the VMs 285$_1$-285$_M$ may be configured according to one or more software configurations that are being used by electronic devices connected to a particular enterprise network (e.g., network "client" device(s) 220) or prevalent types of software configurations (e.g., a Windows® 7 OS; a certain version of a particular web browser such as Internet Explorer®; Adobe® PDF™ reader application). As yet another alternative embodiment, the VMs 285$_1$-285$_M$ may be configured to support concurrent (e.g. at least partially simultaneous in time) virtual execution of a variety of different software configurations in efforts to verify that the suspicious object is part of a malicious attack. Of course, it is contemplated that the VM configuration described above may be handled by logic other than the scheduler 265.

According to one embodiment of the disclosure, the dynamic analysis engine 160 is adapted to execute one or more VMs 285$_1$-285$_M$ to simulate the receipt and execution of content associated with the object under analysis within a run-time environment as expected by the type of object. For instance, dynamic analysis engine 160 may optionally include processing logic 280 to emulate and provide anticipated signaling to the VM(s) 285$_1$, . . . , and/or 285$_M$ during virtual processing.

For example, the processing logic 280 may be adapted to provide, and sometimes modify (e.g., modify IP address, etc.) packets associated with the suspect object 240 in order to control return signaling back to the virtual execution environment 162. Hence, the processing logic 280 may suppress (e.g., discard) the return network traffic so that the return network traffic is not transmitted to a network providing connectivity to the network (client) device 220.

Although not shown in FIG. 2, monitoring logic within the virtual execution environment 162 may be configured to monitor behaviors of one or more VMs 285$_1$, . . . , and/or 285$_M$, such as VM 285$_1$ configured to execute the suspect object 240. This monitoring is conducted to detect anomalous (e.g., unexpected, irregular, etc.) activity indicative of malware. When anomalous activity is detected, the monitoring logic operating with the second classification engine 164 to compute a dynamic analysis confidence score and provide VM-based results 288 (e.g., dynamic analysis confidence score, information associated with the detected anomalous behaviors, and/or other information associated with the detected malicious activity by the suspect object) to the platform-based classification engine 295.

It is noted that the second classification engine 164 may not be implemented within the dynamic analysis engine 160. Instead, the platform-based classification engine 295 receives the VM-based results 288 (without the dynamic analysis confidence score) and conducts a classification of the object based on the VM-based results and/or SA results (or static analysis confidence value). It is contemplated that the confidence score produced by the VM-based results 288 may be weighted differently than the static analysis confidence score.

In general, the collective platform-based classification engine 295 may be configured to receive the VM-based results 288. According to one embodiment of the disclosure, the classification engine 295 comprises prioritization logic 296 and score determination logic 297. The prioritization logic 296 may be configured to apply weighting to VM-based results 288 and/or static analysis-based results 260 from static analysis engine 120. According to one embodiment, these VM-based results 288 may include the dynamic analysis confidence score and/or the SA-based result 260 may include the static analysis confidence score.

The score determination logic 297 comprises one or more software modules that are used to determine a final probability as to whether the suspect object 240 is malicious, and the resultant score representative of this final probability may be included as part of results provided to the reporting engine 290 for reporting. The score determination logic 297 may rely on the predictive model (or updated predictive model provided as the reference model) to determine the score assigned to the object.

Herein, the reporting engine 290 generates reports (e.g., various types of signaling such as messages including text messages and email messages, display images, or other types of information over a wired or wireless communication path) to identify to a network administrator the presence of a detected suspect object in the received network traffic. The reports may include a detailed summary of at least the malware detected by the TDP 150₁.

Although the illustrative embodiment describes the updating of the predictive model for the classification engine 124 within the static analysis engine, it is contemplated that the similar operations may be conducted for the classification engine 164 of the dynamic analysis engine 160 and/or the collective classification engine, where the results from the detection engines of the static analysis engine 140 and/or dynamic analysis engine 160 is in disagreement and the result of the classification engine 295.

V. Exemplary Logic Layout of TDP

Figure 3:
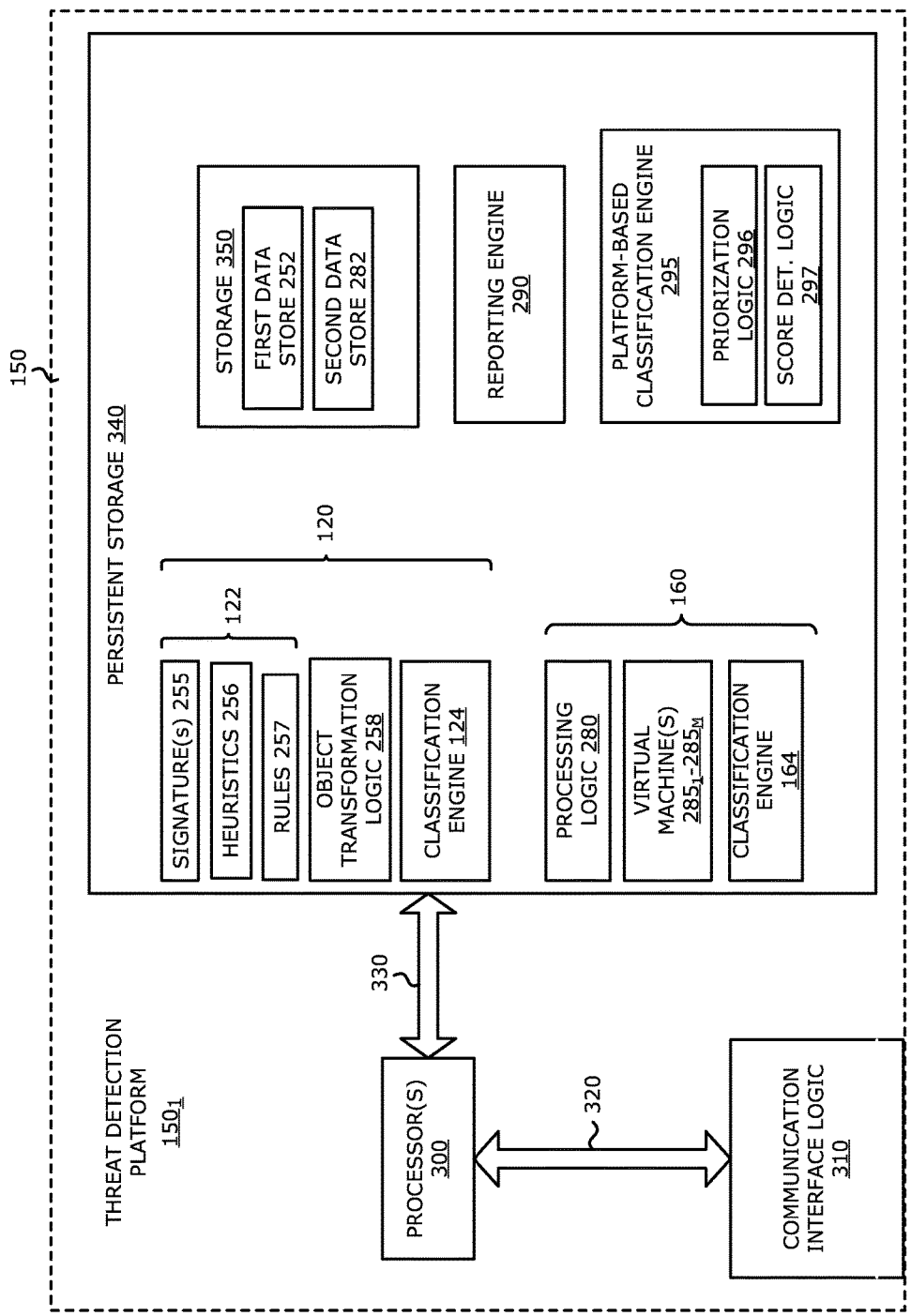
FIG. 3 is an exemplary block diagram of logic associated with the TDP of FIG. 2.

Referring now to FIG. 3, an exemplary block diagram of logic associated with TDP 150₁ of FIG. 2 is shown. TDP 150₁ comprises one or more processors 300 that are coupled to communication interface logic 310 via a first transmission medium 320. Communication interface logic 310 enables communications with other TDPs 150₂-150₃ and management system 205 of FIG. 2. According to one embodiment of the disclosure, communication interface logic 310 may be implemented as a physical interface including one or more ports for wired connectors. Additionally, or in the alterna- tive, communication interface logic 310 may be implemented with one or more radio units for supporting wireless communications with other electronic devices.

Processor(s) 300 is further coupled to persistent storage 340 via transmission medium 330. According to one embodiment of the disclosure, persistent storage 340 may include (a) static analysis engine 120, including the first detection engine 122 and the first classification engine 124; (b) the dynamic analysis engine 160 that comprises the second detection engine 162 that includes the virtual execution environment and the second classification engine 164; (c) the platform-based classification engine 295 including prioritization logic 296, score determination logic 297; (d) reporting engine 290; and (e) data stores 252 and 282. Of course, when implemented as hardware, one or more of these logic units could be implemented separately from each other. The engines contained within persistent storage 340 are executed by processor(s) and perform operations as described above.

VI. Exemplary Logic Layout of Classification Testing System

Figure 4:
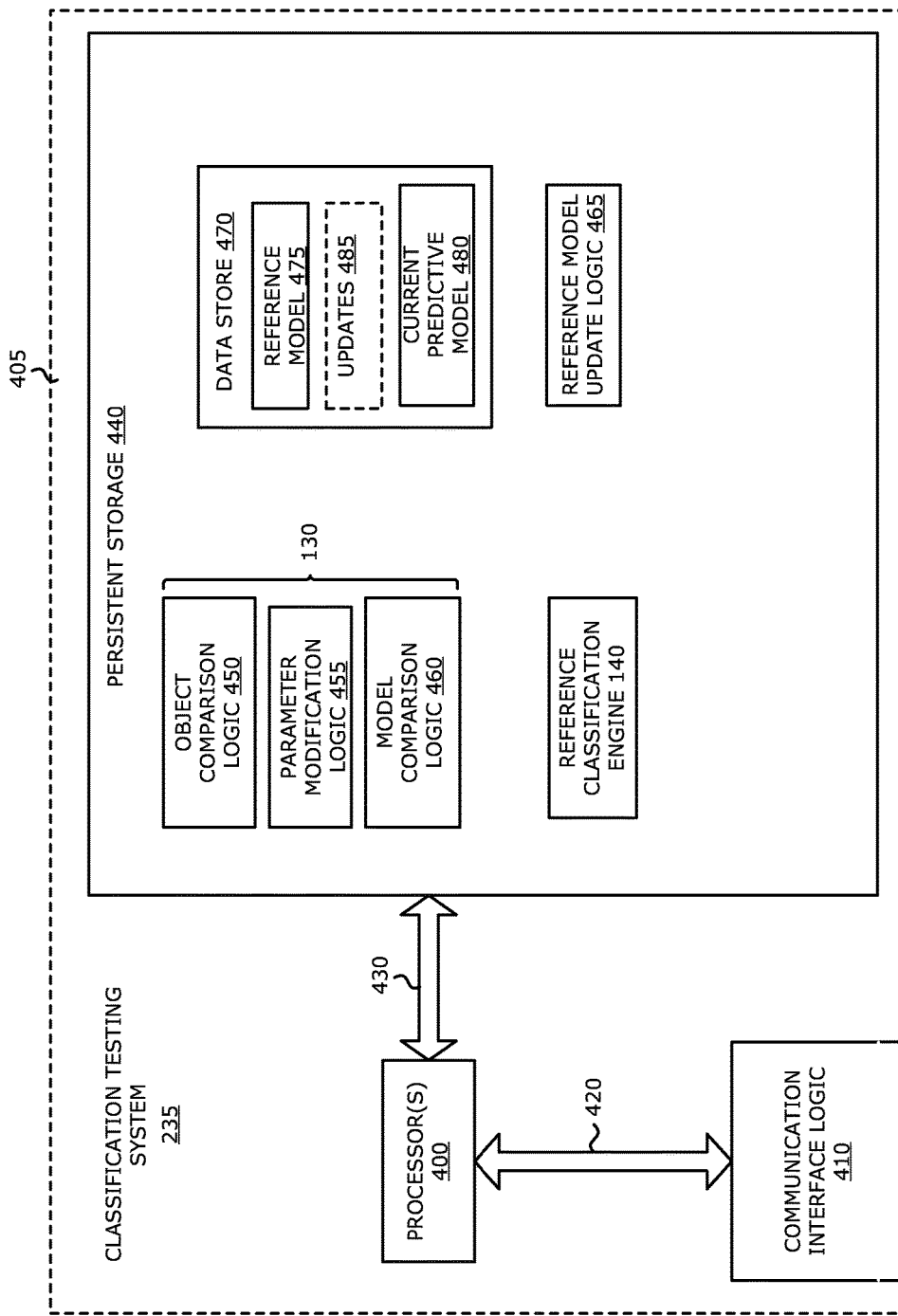
FIG. 4 is an exemplary block diagram of logic associated with the classification testing system of FIG. 2.

Referring now to FIG. 4, an exemplary block diagram of logic associated with the classification testing system 235 of FIG. 2 is shown. The classification testing system 235 comprises a housing 405 that at least partially encases one or more processors 400, which are coupled to communication interface logic 410 via a first transmission medium 420. Communication interface logic 410 enables communications with one or more TDPs (e.g., TDP 150₁) to receive information associated with the suspect object for adjustment of logic associated with classification engine 140 and/or classification engines deployed with the TDP 150₁. According to one embodiment of the disclosure, communication interface logic 410 may be implemented as a physical interface including one or more ports for wired connectors. Additionally, or in the alternative, communication interface logic 410 may be implemented with one or more radio units for supporting wireless communications with other electronic devices.

Processor(s) 400 is further coupled to persistent storage 440 via transmission medium 430. According to one embodiment of the disclosure, persistent storage 440 may include (a) training engine 130, including object comparison logic 450, parameter modification logic 455 and model comparison logic 460; (b) the reference classification engine 140; (c) reference model update logic 465; and (d) data store 470. Of course, when implemented as hardware, one or more of these logic units could be implemented separately from each other.

Herein, executed by the processor(s) 400, the training engine 130 receives an identifier of the object and activates the object comparison logic 450 to determine if the object has been evaluated previously in accordance with the current predictive model. The object comparison logic 450 maintains a listing of identifiers that represent those objects for which features have been evaluated in an update of the current predictive model.

If the object is determined by the object comparison logic 450 to have been previously evaluated in generation of the reference model 475, the parameter modification logic 455 may disregard such features or further adjust parameters within a current predictive model 480 (e.g., decision-tree analysis) given that there are repeated occurrences of this type of malicious object. If the object has not been previously evaluated in generation of the reference model 475, the parameter modification logic 455 analyzes the static analysis results of the object, and based on these results, may modify one or more parameters associated with the current predictive model 480 in generation of the reference model 475 to better detect malicious objects with these types of features. Examples of parameter modifications may include changing certain values in the decision-tree analysis as provided by the current predictive model.

Upon the model comparison logic 460 determining that the current predictive model 480 remains ineffective in detecting malicious objects or is becoming less effective in detecting malicious objects, an alert is provided to the reference model update logic 465 to update the current predictive model 480 by substitution of the reference model 475 at the reference classification engine 140 (or provide the updates 485 as represented as an optional feature by dashed lines). Furthermore, reference classification engine 140 may propagate the reference model 480 to other classification engines, including classification engine 124 and 164 that are utilized by the analysis engines 120 and 160 as well as platform-based classification engine 295.

VII. Exemplary Threat Detection and Prevention Processes

Figure 5A:
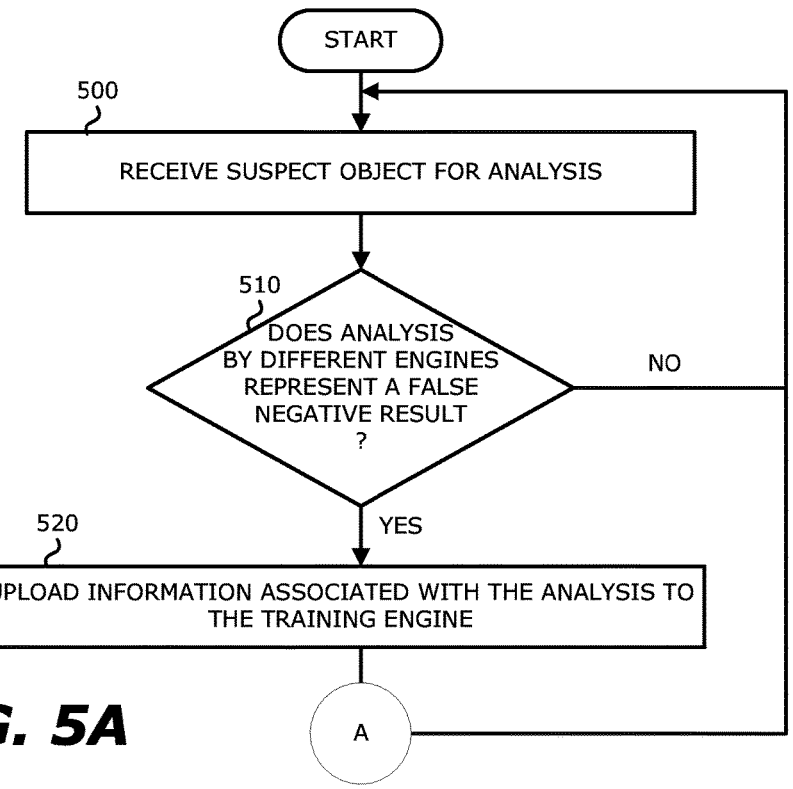
FIGS. 5A-5C are general exemplary flowcharts that illustrates operation conducted by an electronic device for determining and conducting an update of a classification engine.
Figure 6:
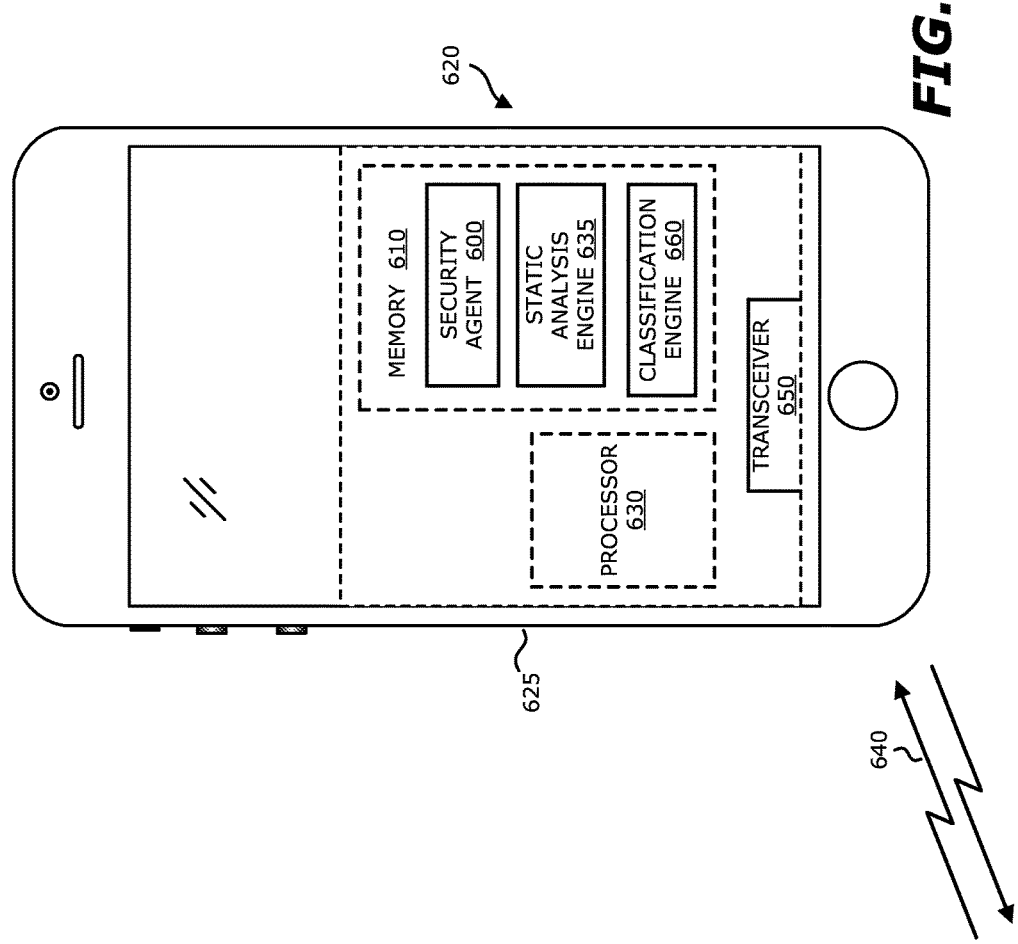
FIG. 6 is an exemplary embodiment of an endpoint device including a security agent that conducts the classification engine update scheme as described in FIG. 1.

Referring to FIG. 5A, a general exemplary flowchart is shown that illustrates operations conducted by an electronic device, such as a TDP or a portable device of FIG. 6 for example, for determining whether an update of the classification engine may be warranted. Upon receiving a suspect object, an analysis is conducted to determine whether the results produced by different engines in analyzing the same object for malicious features represent a false negative result, which suggests that a potential update of the classification engine is warranted (blocks 500 and 510). More specifically, this analysis may involve (i) a first analysis by a detection engine that determines whether an object under analysis is malicious and (ii) a second analysis by the classification engine that determines either (a) the suspect object is non-malicious or (b) the suspect object is malicious but the degree of malicious falls below a prescribed threshold. Based on the analysis associated with the object, if there are no potential false negative events in the analysis, no modification of the classification engine is needed.

If the analysis denotes a potential false negative event, information associated with the analysis of the object is provided to a training engine to determine whether the classification engine should be updated (block 520). As described above, this information may include, but is not limited or restricted to (1) the identifier of the object (e.g., hash value of the object such as a message digest produced in accordance with Message Direct "MD5" algorithm), (2) one or more suspect features of the object and/or (3) results of the preliminary classification by the classification engine (e.g., confidence values).

Figure 5B:
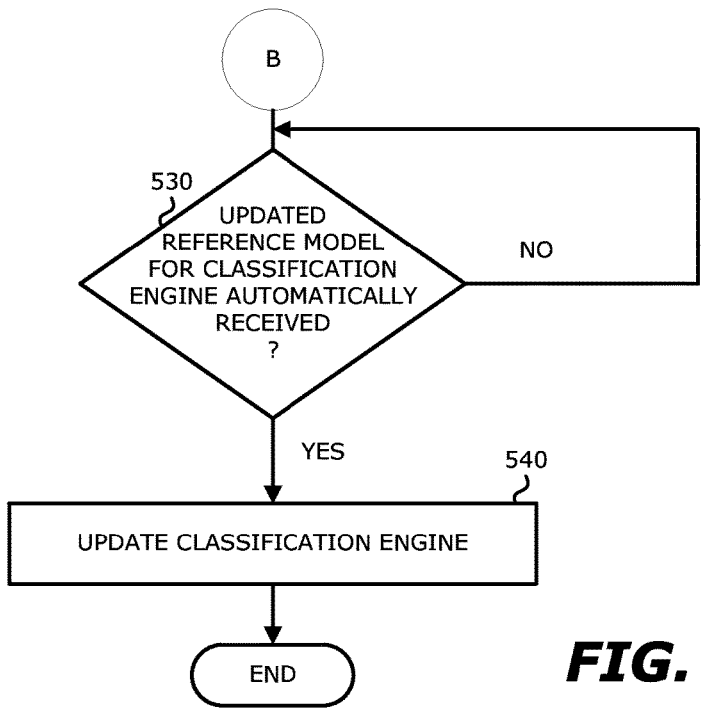

Thereafter, as shown in FIG. 5B, without user intervention and when an update of the classification engine is needed, the TDP automatically receives a reference model, namely an updated predictive model, which is used to modify the functionality of the classification engine (block 530). Upon receipt, the classification engine is updated with the reference model (block 540).

Figure 5C:
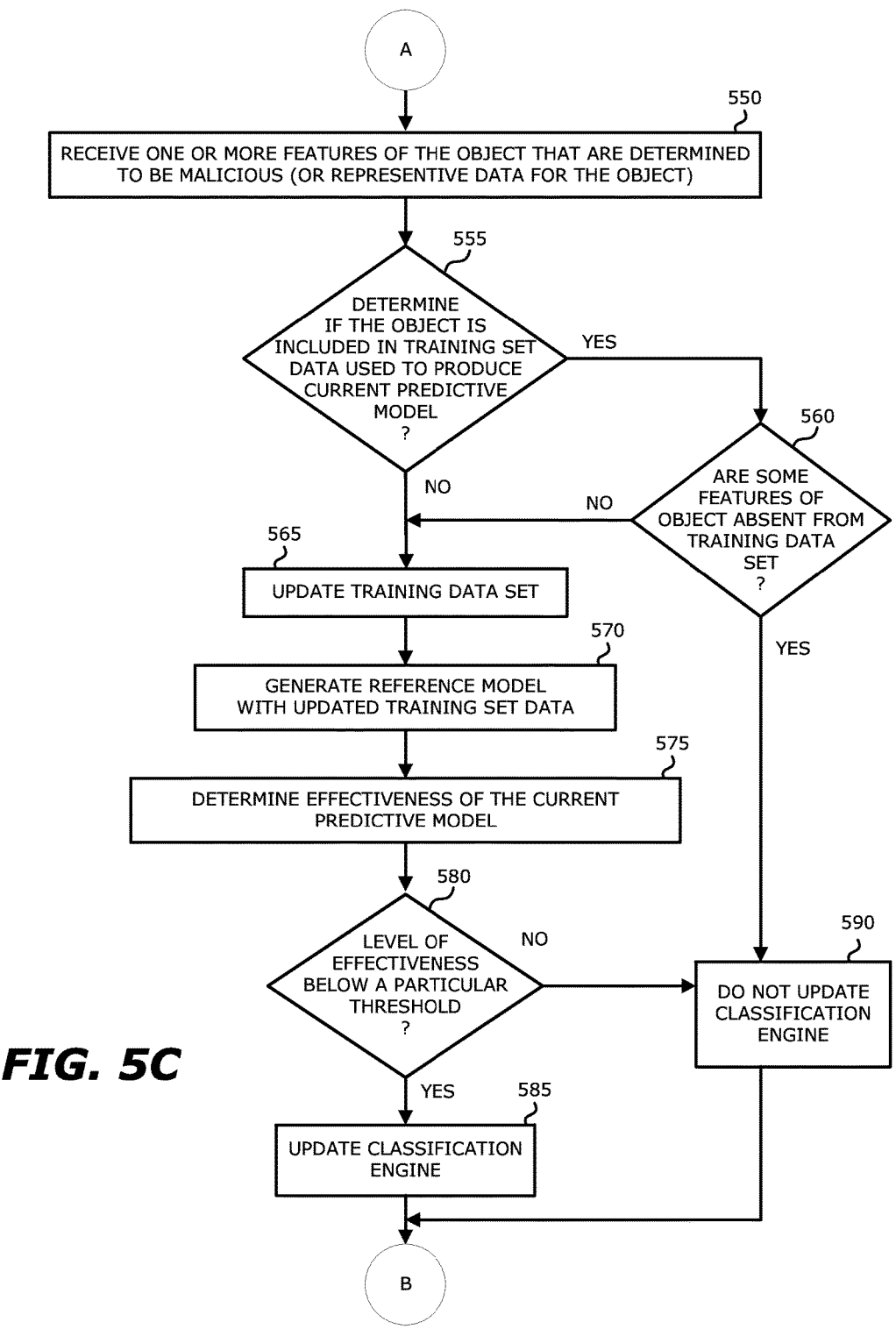

Referring now to FIG. 5C, a general exemplary flowchart is shown that illustrates a process for determining whether the update of the classification engine is warranted. First, a training engine receives information associated with the suspect object that is associated with a preliminary false negative event (block 550). Stated differently, the training engine receives one or more features of the object where a detection engine determined that the object includes malicious features, but the classification engine determined that the suspect object is non-malicious or is malicious but the degree of malicious falls below a prescribed threshold. As described above, this information may include, but is not limited or restricted to (1) an identifier of the object (e.g., hash value of the object such as a message digest produced in accordance with Message Direct "MD5" algorithm), (2) one or more suspect features of the object and/or (3) results of the preliminary classification by the classification engine (e.g., confidence values).

Thereafter, the training engine determines whether the suspect object is included in a training data set that is used to produce a current predictive model (block 555). This may involve a comparison of the provided identifier to a list of identifiers representing those objects that have been analyzed in determination of the current predictive model. If not, a secondary determination is made as to whether there exist certain features of the suspect object that were not present in any of the prior objects considered in generation of the current predictive model (block 560). If the objects include different features for analysis or the suspect object is not part of the training set data used to produce the current predictive model, the training data set is updated with the different features, along with different weighting and/or scores (block 565). Otherwise, the training data set is not updated.

Thereafter, the current predictive model is updated using the updated training data set to produce the reference model (block 570). Using at least part of the information received with the feature(s) of the suspect object, if the level of effectiveness of the current predictive model falls below a particular threshold (e.g., number of false negative events is now greater than a preset number, confidence values for detected malicious features falls below a set value, etc.), the classification engine is updated with the reference model (blocks 575, 580 and 585). Otherwise, the classification engine continues to utilize the current predictive model for classification of suspect objects as malicious or not (block 590).

It is contemplated that the classification engine update scheme, as described above, may also be conducted by a security agent 600 as shown in FIG. 6. Herein, the security agent 600 is stored within a memory 610 encased within a housing 625 of an endpoint device 620. Upon execution by a processor 630, the security agent 600 activates a static analysis engine 635 to conduct a static analysis of at least a portion of information 640 received by a transceiver 650 of the endpoint device 620. As before, in response to the static analysis engine and the classification engine 660 reaching different determinations (or the same determinations with results that exceed a certain difference threshold), security agent 600 uploads the control message including the one or more malicious features to a training engine located as part of cloud computing services or residing within a particular enterprise network (not shown). Thereafter, the classification engine 660 may be automatically updated, without user intervention, depending on the findings by the training engine.

VIII. Second Embodiment for a Classification Engine Update Scheme

More specifically, according to another illustrative embodiment, malware may be discovered through a two-stage process in the threat detection platform 150, including the static analysis engine 120 and the dynamic analysis engine 160. Herein, the static analysis engine 120, upon determining that a suspect object is suspicious (e.g., exceeds a certain likelihood that the object is malicious), submits the suspect object for behavior analysis by processing this object in a run-time (virtual) environment. After behavioral analysis, the object may be classified as malicious or non-malicious.

If the initial static analysis determines that an object is not malicious, the object may be further analyzed through a secondary static analysis operable after the behavioral analysis, which extracts and analyzes relevant features of the object. The relevant features include those that may have been obfuscated during the initial static analysis but manifested themselves during execution (e.g., due to encryption or other encoding). Maintained within the threat detection platform 150 or located in the cloud, as shown, the classification engine 140 associated with the secondary static analysis may be configured to determine if the object is malicious by evaluating each feature and pattern of features received from the secondary static analysis engine.

As before, this classification engine 140 may use a decision-tree learning algorithm as a predictive model, where the decision-tree learning algorithm may be developed using machine learning techniques from prior analysis of labelled and unlabeled malware and benign objects and/or experiential knowledge from human analysts. Herein, the classification engine 140 computes a score associated with the features and pattern of features reflecting the probability that the object is malicious. Once the score for the features has been determined, the classification engine 140 may transmit that score to the dynamic analysis engine 160 to be used in the analysis of the object or may transmit information to the training engine 130 to modify the predictive model to account for malicious detection discrepancies, as described above.

According to another embodiment of the disclosure, where the object is determined to be malicious by the first detection engine 122 (e.g., static analysis engine) and is classified by the platform-based classification engine 140 as malicious by assigning a confidence score (e.g., a value representing a probability of the object being malicious), but the confidence score fails to exceed a prescribed threshold score, the above-described information associated with the object may also be provided to the training engine 130. Concurrently, the object and results by the static analysis engine 120 are provided to the dynamic engine 160 for analysis.

The training engine 130 is responsible for generating a new feature-specific predictive (reference) model from features and patterns of features identified through actual static analysis of the object, but for this embodiment, where a "current" predictive model used in the platform-based classification engine 140 determines that the object is malicious. For this embodiment, results produced by a test analysis conducted in accordance with the reference model, is compared to results produced by a test analysis conducted in accordance with the current predictive model. The comparison is conducted to assess whether the two results yield substantially different scores related to the probability that the object is malicious. If the difference in scores exceeds a threshold, the current predictive model may be modified to reflect the reference model, at least with respect to the features or pattern of features identified in the static analysis.

In arriving at the scores prescribed by the reference model, the following operations may be practiced. The current predictive model may yield, for example, a score of "80" for the object, where any score over "75" denotes that the object is to be classified by malicious. Since an object is classified as malicious, it may be deemed to deserve an overall score of "100", and thus, the difference is determined to be "20" (100 minus 80). If the threshold for updating the predictive model is 15, for example, the predictive model associated with the classification engine requires updating with the reference model or modification of the current predictive model in accordance with the generated updates. The updates may be achieved by simply (1) decomposing that "100" score and (2) assigning component scores to each feature or pattern of features so as to yield a higher score for some than that associated with the feature (or pattern) by the current predictive model. For example, if the current predictive model associates a score of 30 with a particular feature (e.g., length of a string) identified in the object, but the reference model determines that that string is a stronger indicator of maliciousness, and accords this feature with a score of 40, the predictive model is modified by changing the associated score from 30 to 40 for future analysis of object. This approach is not dependent on the type of object analyzed, which may be an Office® document, PDF file, or JAR files, for example.

In the foregoing description, the invention is described with reference to specific exemplary embodiments thereof. It will, however, be evident that various modifications and changes may be made thereto without departing from the broader spirit and scope of the invention. For instance, training engine 130 may be referenced and/or provide updated predictive models only upon the classification of the object as a particular exploit (e.g., crimeware, malvetisement,) or a malicious object from a specific threat actor.

What is claimed is:

1. An apparatus comprising:
   one or more processors; and
   a non-transitory storage medium communicatively coupled to the one or more processors, the non-transitory medium includes a first analysis engine that comprises
      a detection engine that analyzes an object to determine if the object is malicious, and
      a classification engine that is configured to (i) receive results of the analysis of the object conducted by the detection engine, and (ii) analyze, based at least in part on the results from the detection engine, whether the object is determined to be malicious in accordance with a predictive model,
   wherein, in response to the detection engine and the classification engine differing in a determination as to whether the object is to be classified as malicious, transmitting information associated with at least a portion of the results from the analysis of the object by at least one of the detection engine and the classification engine to a service remotely located from the apparatus and receiving an update of the predictive model for use by the classification engine, the update of the predictive model is conducted to reduce a number or a rate of at least false negative determinations by the classification engine using the predictive model, and
   wherein, in response to the detection engine and the classification engine being consistent in the determination as to whether the object is to be classified as malicious or non-malicious, refraining by the first analysis engine from transmitting the information associated with at least the portion of the results to the service.

2. The apparatus of claim 1, wherein the classification engine further receives the update of the predictive model in response to one of the false negative determinations that includes the detection engine determining that the object is malicious while the classification engine determining that the object is non-malicious.

3. The apparatus of claim 1, wherein the classification engine further receives the update of the predictive model in response to (i) a confirmation that the apparatus subscribes to a service that automatically updates predictive models used by the classification engine and (ii) the detection engine determines that the object is malicious while the classification engine determines that the object is non-malicious.

4. The apparatus of claim 1, wherein the detection engine and the classification engine are part of a static analysis engine that performs pattern checking operations on the object including heuristic or determinative rule-based analysis.

5. The apparatus of claim 1, wherein the detection engine is part of a static analysis engine and the classification engine is part of a dynamic analysis engine, the dynamic analysis engine includes one or more virtual machines that process the object and are configured in accordance with one or more software configurations.

6. The apparatus of claim 1, wherein the uploaded information comprises (1) an identifier of the object, and (2) one or more features of the object that can be used by the predictive model to classify the object as malicious.

7. The apparatus of claim 6, wherein the uploaded information further comprises (3) results from a preliminary classification of the object by the classification engine.

8. The apparatus of claim 6, wherein the identifier of the object is a hash value of the object.

9. The apparatus of claim 6, wherein the uploaded information further comprises (3) the results from a preliminary classification of the object by the detection engine.

10. The apparatus of claim 1, wherein, in further response to the detection engine and the classification engine being consistent in the determination as to whether the object is to be classified as malicious or non-malicious, providing, by the first analysis engine, at least the object to a second analysis engine that includes at least a second classification engine, the second analysis engine to conduct an additional analysis of the object to classify whether the object is malicious or non-malicious.

11. The apparatus of claim 10, wherein, in further response to the detection engine and the classification engine being consistent in the determination as to whether the object is to be classified as malicious or non-malicious, providing by the first analysis engine at least the results of the analysis of the object conducted by the detection engine along with the object to the second analysis engine.

12. The apparatus of claim 10, wherein, in further response to the detection engine and the classification engine being consistent in the determination as to whether the object is to be classified as malicious or non-malicious, providing by the first analysis engine at least results of a preliminary classification of the object by the classification engine along with the object to the second analysis engine.

13. The apparatus of claim 1, wherein the service includes either (i) part of cloud computing services or (ii) part of services for an enterprise network.

14. A classification testing system comprising:
a hardware processor; and
a data store coupled to the processor, the data store comprises one or more engines that, upon execution by the hardware processor and in response to a prior analysis of an object by a classification engine, which is operating as part of an electronic device remotely located from the classification testing system, analyzing the object using a first predictive model to determine whether the object is associated with a malicious attack, and responsive to detecting a potential false negative event, modifying one or more parameters associated with the first predictive model to produce a second predictive model that is provided to the classification engine for now detecting whether the object is associated with a malicious attack.

15. The apparatus of claim 14, wherein the one or more engines to receive information associated with the prior analysis of the object, the information comprise (i) an identifier of the object and (ii) one or more features of the object that are determined as being associated with the malicious attack.

16. The apparatus of claim 15, wherein the one or more engines compare the identifier with stored identifiers to determine if the object has been previously analyzed in an update of the first predictive model.

17. The apparatus of claim 15, wherein the one or more engines modify the one or more parameters that are directed to a decision-tree analysis of the one or more features of the object.

18. The apparatus of claim 17, wherein the one or more engines modify a first parameter of the one or more parameters by changing a value corresponding to the first parameter in the decision-tree analysis associated with the first predictive model to produce the second predictive model.

19. The apparatus of claim 15, wherein the information received by the one or more engines further comprise (iii) results of a preliminary classification conducted by the classification engine that produced the false negative event, the results of the preliminary classification include a confidence score representing a probability that the object is associated with the malicious attack.

20. The apparatus of claim 15, wherein the information received by the one or more engines further comprise (iii) results of a preliminary classification conducted by a detection engine that detected the object as being associated with the malicious attack in contrast with a result of a preliminary classification conducted by the classification engine that includes the first predictive model for analysis of the object for malware.

21. The apparatus of claim 14, wherein the one or more engines that, upon execution by the hardware processor and in response to modifying the one or more parameters associated with the first predictive model to produce the second predictive model, output the second predictive model to the classification engine for updating the first predictive model that is currently being used by the classification engine.

22. An apparatus comprising:
one or more hardware processors; and
a memory coupled to the one or more processors, the memory comprises
a detection engine that, when executed by the one or more processors, analyzes an object to produce a first result, the first result identifies whether the object is malicious or non-malicious; and
a classification engine that, when executed by the one or more processors, analyzes one or more features of the object to produce a second result, the second result identifies whether the object is malicious or non-malicious in accordance with a predictive model, wherein, in response to the first result of the detection engine and the second result of the classification engine differing in a determination as to whether the object is malicious, uploading information associated with at least a portion of results from the analysis of the object by at least one of the detection engine and the classification engine and, based on the uploaded information identifying that the predictive model is ineffective or is becoming ineffective, receiving an update of the predictive model to reduce a number or a rate of at least false negative determinations by the classification engine, and wherein, in response to the first result of the detection engine and the second result of the classification engine being consistent in the determination as to whether the object is to be classified as malicious or non-malicious, refraining from uploading the information associated with at least the portion of results from the analysis of the object.

23. The apparatus of claim 22, wherein the classification engine to receive the update of the predictive model subsequent and in response to one of the false negative determinations that includes the detection engine determining that the object is malicious and the classification engine determining that the object is non-malicious.

24. The apparatus of claim 22, wherein the classification engine to receive the update of the predictive model subsequent and in response to (i) the apparatus subscribing to a service that automatically updates predictive models used by the classification engine and (ii) the detection engine determining that the object is malicious and the classification engine determining that the object is non-malicious.

25. The apparatus of claim 22, wherein the detection engine is part of a static analysis engine and the classification engine is part of a dynamic analysis engine, the dynamic analysis engine includes one or more virtual machines that process the object and are configured in accordance with one or more software configurations.

26. The apparatus of claim 22, wherein the uploaded information comprises (1) an identifier of the object, and (2) one or more features of the object that can be used by the predictive model to classify the object as malicious.

27. The apparatus of claim 26, wherein the uploaded information further comprises (3) the results from a preliminary classification of the object by the classification engine that include a confidence score that identifies a likelihood of the object being malicious.

28. An apparatus comprising:
one or more processors; and
a non-transitory storage medium communicatively coupled to the one or more processors, the non-transitory storage medium includes an analysis engine that comprises
a detection engine that analyzes an object to uncover one or more features of the object that are used to determine whether the object is malicious or non-malicious, and
a classification engine that is configured to (i) receive the features of the object conducted by the detection engine, and (ii) determine, based at least in part on the information from the detection engine and in accordance with values assigned to different parameters of a predictive model to identify features of the object that tend to be associated with malware, a confidence score associated with the object, the confidence score identified a probability of the object is malicious, wherein, in response to the detection engine and the classification engine differing in a determination as to whether the object is to be classified as malicious, uploading information associated with at least a portion of the results from the analysis of the object by at least one of the detection engine and the classification engine for use in determining whether an update of values associated with one or more parameters of the predictive model so as to reduce a number or a rate of at least false negative determinations by the classification engine, and wherein, in response to the detection engine and the classification engine being consistent in the determination as to whether the object is to be classified as malicious or non-malicious, refraining by the analysis engine from uploading the information associated with at least the portion of the results.

* * * * *